United States Patent

Li et al.

[11] Patent Number: 6,052,799
[45] Date of Patent: Apr. 18, 2000

[54] SYSTEM AND METHOD FOR RECOVERING A DIRECTORY FOR A LOG STRUCTURED ARRAY

[75] Inventors: Juan Li; Dung K. Nguyen, both of San Jose; Mien Shih, Saratoga; Hai-Fang yun, San Jose, all of Calif.

[73] Assignee: International Business Machines Corporation, Armonk, N.Y.

[21] Appl. No.: 09/079,913

[22] Filed: May 15, 1998

[51] Int. Cl.[7] .............................. G06F 11/00; G06F 12/00
[52] U.S. Cl. .............................. 714/13; 714/20; 711/114; 711/136
[58] Field of Search .................................. 714/1, 6, 7, 10, 714/13, 15, 16, 20, 710, 764, 769, 770, 799; 711/111–114, 136, 211

[56] References Cited

U.S. PATENT DOCUMENTS

| | | | |
|---|---|---|---|
| 4,914,656 | 4/1990 | Dumphy, Jr. et al. | 714/710 |
| 5,247,647 | 9/1993 | Brown et al. | 714/1 |
| 5,263,145 | 11/1993 | Brady et al. | 711/114 |
| 5,301,297 | 4/1994 | Menon et al. | 711/114 |
| 5,379,385 | 1/1995 | Shomler | 711/211 |
| 5,394,532 | 2/1995 | Belsan | 711/114 |
| 5,488,701 | 1/1996 | Brady et al. | 714/6 |
| 5,551,003 | 8/1996 | Mattson et al. | 711/136 |
| 5,555,371 | 9/1996 | Duyanovich et al. | 714/13 |

OTHER PUBLICATIONS

Patterson et al., A Case for Redundant Arrays of Inexpensive Disks (RAID), ACM SIGMOD 88, Jun. 1988, pp. 109–116.
Rosenblum et al., "The Design and Implementation of a Log Structured File System", Proceedings of the Thirteenth ACM Symposium on Operating Systems Principles, Oct. 13–16, 1991 Asilomar Conference Center.
Douglis et al., "Log–Structured File Systems", IEEE, Feb. 27–Mar. 3, 1989 Spring CompCon 89, 34th IEE Computer Conference.

Primary Examiner—Emmanuel L. Moise
Attorney, Agent, or Firm—Esther E. Klein

[57] ABSTRACT

In a storage system comprising an array of storage devices including a processor and memory, a plurality of data blocks are organized on the storage devices in segments striped across the storage devices. A main directory stored in memory contains the location on the storage device of each of the current data blocks. A method is provided for recovering a main directory in the event that the main directory becomes damaged. A segment directory having information on the data blocks in the segment is stored as part of the segment on the storage devices. Periodically a checkpoint of the main directory is written to the storage devices. A list is maintained of closed segments written to the storage devices since the checkpoint directory was written to the storage devices. During a main directory recovery procedure, the checkpoint of the main directory is read into memory, and for each segment that is indicated by the closed segments list as having been closed since the checkpoint of the main directory was written to the disk, the information in the corresponding segment directory is used to update the checkpoint directory.

19 Claims, 5 Drawing Sheets

SYSTEM AND METHOD FOR RECOVERING A DIRECTORY FOR A LOG STRUCTURED ARRAY

FIELD OF THE INVENTION

This invention relates to a storage system comprising an array of storage devices where data blocks are arranged as a log structured array. More particularly, this invention relates to recovering a directory identifying locations of data blocks stored in a log structured array.

BACKGROUND OF THE INVENTION

A disk array is a collection of hard disk drives (HDDs) managed as a unit. Disk arrays can provide a better data I/O rate and data availability for application programs than single large capacity disks.

In "A Case for Redundant Arrays of Inexpensive Disks" report no. UCB/CSD/87/391, December 1987, Patterson et al. defined five levels of RAID. In each RAID level, redundant information is provided so that if one of the HDDs is unavailable, the data on that HDD can be reconstructed from one or more of the other HDDS in the array. RAID-1, often referred to as disk mirroring or data duplexing, stores identical images of user data on two or more member HDDs. In the RAID level 3, 4 and 5 systems, redundancy is provided using parity data.

In RAID level 4 and 5 systems, blocks of data are stored on each HDD in the array, and parity is calculated based on a group of blocks of data on each disk drive. A parity stripe or segment consists of a set of corresponding data blocks on each disk drive and a parity block calculated from those data blocks. Data can be striped at many levels, by blocks, tracks, multiple tracks, cylinders, and so forth. In RAID-5, parity is rotated amongst all the disk drives which makes the workload on the disks in the array uniform. Other RAID levels are also known including RAID-0 where data is striped on a set of HDDs but the array does not include any parity or other redundant information.

Customers of storage arrays are most concerned with reliability, access times, and cost per megabyte of data stored. RAID systems provide a way of addressing the reliability issue and access requirements. Access time is improved by caching data. A cache is a random access memory often included as part of a storage subsystem to further increase the I/O speed. A cache stores information that either has recently been requested from the disk or that needs to be written to the disk.

Data compression techniques provide a solution for improving the cost per megabyte of data storage. However, there are problems with implementing compression in RAID systems where data is always stored in the same location (home address) even after it continues to be modified. Although a good compression algorithm yields space savings in general, the amount of compression achieved is dependant on the actual data values. After a piece of data is updated it may not compress as well as it did before it was updated so it may not fit back into the space that had been allocated for it before the update. This creates a problem for any storage system where data is assigned a home address.

In a RAID level 5 system, parity information is updated for a write operation from the logical combination of the old data, the new data, and the old parity. While RAID-5 provides many benefits for increasing concurrent accesses, a write penalty is incurred. Rather than only having one array access for writing the new data, a write operation in RAID 5 requires four array access operations, for reading the old data, reading the old parity, writing new data and writing new parity.

In Rosenblum et al, "The Design and Implementation of a Log Structured File System," Proceedings of the 13th ACM on Operating System Principles, October 1991, a log structured file system was proposed where modified data blocks are re-written to the disk sequentially in a log-like structure. Information is also written with each write operation about the data being written. This information is used in managing the system.

A log structured array (LSA) uses some of the same principles of a log structured file in an array system. There are many benefits to using an LSA over a home address based RAID system. An LSA can accommodate the size changes in data produced through data compression since data is not given a fixed location on the disk. Therefore, in an LSA, data can be stored on disks in a compressed form. Also, since an LSA writes all modifications to disk sequentially in a log like structure, it solves the RAID-5 write penalty problem described previously. There is no longer a need to read the old data and old parity, since data blocks for an entire segment are written together.

Application programs and system software running on a host computer read and write data using logical devices independent of the physical location of the data blocks on a storage device, such as a HDD. Programs access data blocks from the storage system using logical cylinder, logical head, and logical record addresses. The storage system controller translates the logical address to the physical address at which the data block is stored. The host computer is unaware of the manner in which requested data blocks are stored on and accessed from the physical storage devices. The typical unit of data management within the controller is a logical track. A combination of a logical cylinder and logical head address represent the logical track address.

The log structured array consists of N+P+S physical disk drives where N is the number of HDDs worth of physical space available for customer data, P is the number of HDDs worth of space available for parity data, and S is the number of spare HDDS provided. Each HDD is divided into large consecutive areas called segment columns. Typically, a segment column is as large as a logical cylinder. Corresponding segment columns from the N+P+S HDDs constitute a segment. The array has as many segments as there are segment columns on a HDD in the array. In a RAID-5 configuration, one of the segment columns of a segment contains the parity of the remaining data segment columns of the segment. A segment directory is stored as part of each segment providing information on each logical track in the segment.

An LSA allows a logical track to be updated to a different location on disk. Since in an LSA the location of a logical track changes over time, a directory called a main LSA derectory gas an entry for each logical track providing its current location in the disk array.

An LSA directory or portions of it reside in main memory. If a failure or error corrupts or obliterates the contents of memory, this will cause the information in the directory and consequently the data tracked by the directory to be lost.

Examples of very severe failures include loss of power to the subsystem or a hardware failure in a component of the subsystem. These failures are categorized as catastrophic failures that obliterate the LSA directory completely.

A straight forward method to recover the LSA directory from catastrophic failures is to rebuild it from scratch using every single segment directory on disks. This process involves first reading each segment's time stamp of when it was last written to disk and making an ordered list of all the segments according to the time stamps, then reading the segment directory of each segment, one at a time from disk in the order described by the segment list. For each entry in the segment directory the LSA directory entry for the corresponding logical track is built up or updated using the segment directories information. The LSA directory recovery is completed when every segment directory entry of every segment directory is examined. While this provides a simple solution, this recovery process can be very expensive in terms of processing time.

Additionally, there are other errors or failures that can't be corrected by the foregoing method. These errors affect the LSA directory and happen more frequently such as microcode logical errors (MLEs) which require speedy recoveries. These kinds of errors are not as massive and fatal as catastrophic failures and tend to be more local. However, the chance of a separate MLE occurring is greater than that of a catastrophic failure. There is a need for a relatively quick way of recovering the main LSA directory in the event of a MLE.

One or more of the foregoing problems is solved, or one or more of the foregoing goals is achieved in using the current invention.

SUMMARY OF THE INVENTION

It is an object of this invention to recovery an LSA directory following a failure or error, such as a catastrophic failure or a microcode logic error, obliterating or corrupting all or part of the LSA directory, as well as other crucial LSA data structures that are usually stored in volatile main memory.

It is a further object of this invention to enable the recovery of critical LSA data structures in the event of one or more disk failures during the recovery process.

In a storage system comprising an array of storage devices (such as HDDs) including a processor and memory, a plurality of data blocks (such as logical tracks) are organized on the storage devices in segments striped across the storage devices. When a block of data in a segment stored on the storage device in a first location is updated, the updated data block is assigned to a different segment and written to a new storage location. The data block in the first location is designated an old data block. The data block in the new location is designated a current or valid data block. A main LSA directory, stored in memory, identifies the locations of each of the current data blocks on the storage devices.

A system and method are provided for recovering the main LSA directory in the event that the directory becomes damaged. Periodically a checkpoint of the directory is written to the storage devices. A segment list is maintained on the storage devices of segments written to the storage devices since the last checkpoint directory was written to the storage devices. During a directory recovery procedure, the most recent valid checkpoint directory is read into memory, and for each degment that is indicated by the segment list as having been written to the storage devices since the checkpoint directory was written to the storage devices, the information in the corresponding segment directory is used to update the checkpoint directory.

Preferably, each segment includes parity information used to reconstruct the data blocks of the segment in the event a storage device is damaged.

In a further preferred embodiment, an article of manufacture is provided for use in storing and managing a plurality of sets of data blocks in a computer system having memory, and at least one group of storage devices. Sets of data blocks are stored in a segment striped across a group of storage devices. The article of manufacture has computer program code embodied in the medium causing the computer system to perform the task of periodically writing a checkpoint directory to the storage devices, maintaining other control structures and recovering the directory using the checkpoint directory and other control structures.

DETAILED DESCRIPTION OF THE PREFERRED EMBODIMENT

Figure 1:
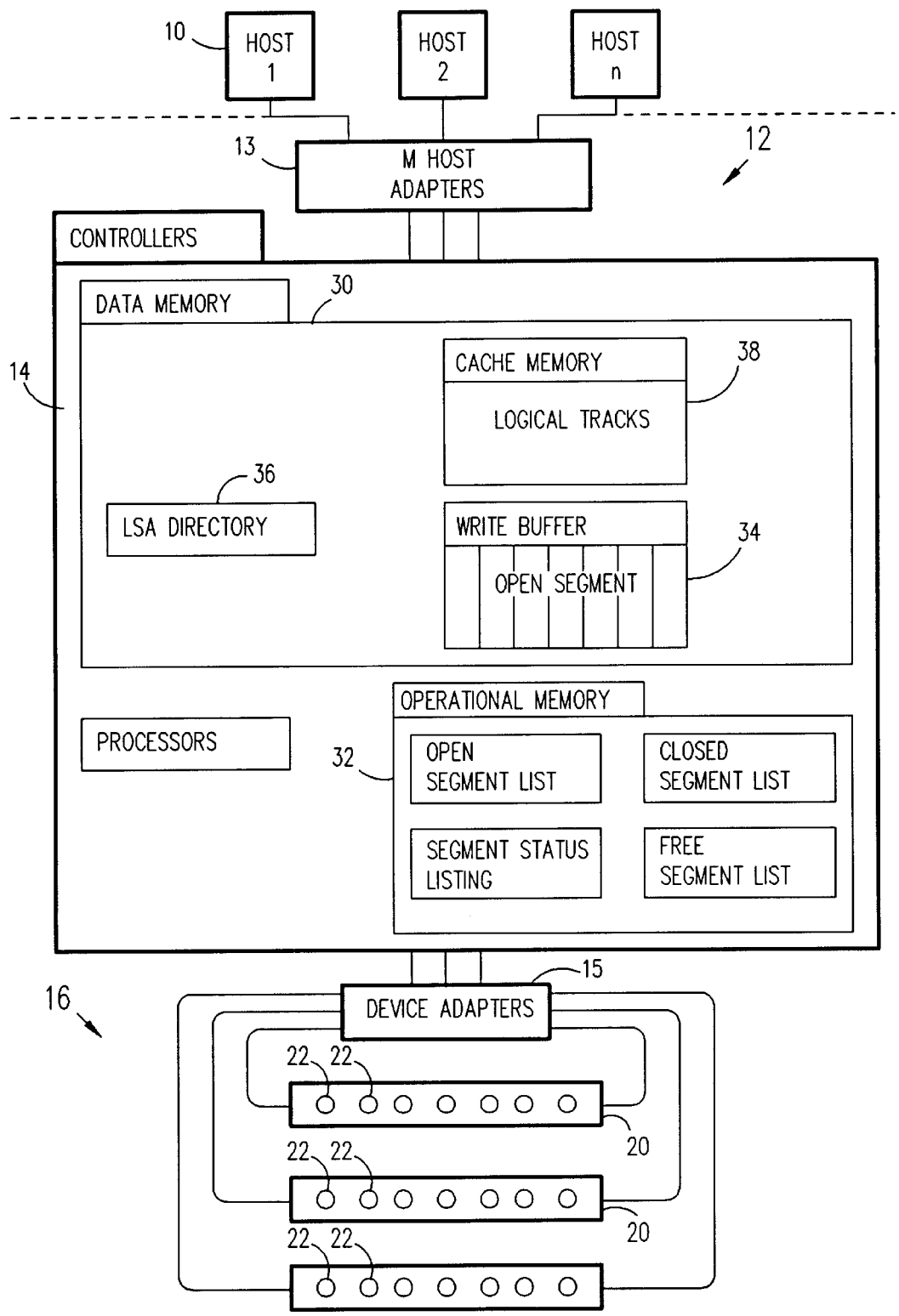
FIG. 1 is a block diagram of a computer system that includes a log structured array and array controller in accordance with the preferred embodiment of the present invention.

Referring to FIG. 1, one or more host processors 10 are connected to an external storage sub-system 12 through one or more host adapters 13. The storage subsystem 12 comprises the host adapters 13, the controllers 14, device adapters 15 and arrays of storage devices 20.

Preferably, a multi-nodal data--straaer system is used. In a multi-nodal data storage system, a data storage controller has multiple nodes, each of the nodes may comprise, for example, an Intel model I960 microprocessor. The multi-processing nodes are interconnected in a torus ring topology. A lower interface (LI) node executes microcode that manages the disk arrays 16, including an LSA partition. The LSA subcomponent of the LI manages the LSA. A cache node manages the cache memory. The LI node and cache node can be the same physical entity, where microcode running at the same node performs the different functions.

A pair of LI nodes can provide shared management. A first node may operate a series of storage devices 1 through 8, while a second would operate storage devices 9 through 16. In the case that the first node fails the second node can take over for the failed node and vice versa. The storage devices may be reassigned from one node to another to balance the nodes workload as well. Alternatively, each node is assigned exclusive control over a selected group of storage devices.

The controllers 14 are connected to the disk drives through one or more device adapters 15. Each device adaptor communicates with at least one disk array 20 comprising a set of N+P+S disk drives 22. Preferably, each disk array is a separate parity group, or an integer number of parity groups, where the parity stored in the group of HDDs is used for reconstructing the data in that parity group.

Each host 10 comprises at least one processor to execute the system and application code, memory to hold system code, application code and data, and an I/O system responsive to Read and Write calls from executing applications for accessing information not in memory, from the external storage.

The present invention may be applicable to a variety of host computers under a number of different operating systems. The host computer may for example be a personal computer, a server, or a main frame computer. In addition, the computer may be a stand alone system or a part of a network such as a local area network or a wide area network.

An example of a host system is the IBM System/370 or System/390 running the IBM MVS operating system. Alternatively, the host system may be, for example, an IBM RS/6000 system running the IBM AIX operating system or any combination thereof. In an MVS system, the host processor creates a dedicated virtual processor for accessing and transferring data over a demand response interface to attached subsystems using chains of special purpose I/O instructions called channel command words (CCW). When an application program executes a Read or Write command requiring access to external storage such as disk storage, the MVS operating system issues a start I/O command. The start I/O command causes a CPU to suspend its multi-processing state, transfer data to the CCW chain and reestablish its prior state after the CCW chain completion. The host sends a CCW chain to the controller over a path, such as the ESCON path or the serial storage architecture (SSA) path.

In an LSA system, the storage controller interprets each of the CCWs and responsively applies counterpart control and address signals over a path to an LSA directory to ascertain the location of data in the disk array.

The CPU within the LSA controller executes program instructions that are stored in the operational memory. These instructions may be loaded into the operational memory through an optional program storage reader. The invention may be implemented using any combination of computer programming software, firmware, or hardware. As a preparatory step in practicing the invention or constructing the apparatus according to the invention, the computer programming code, whether software or firmware, according to the invention will typically be stored in one or more machine readable storage devices, such as a fixed hard drive, diskette, optical disk, magnetic tape, semiconductor memory, such as ROMS, P-ROMS, etc., thereby making an article of manufacture according to the invention. The article of manufacture containing the computer programming code is used by either executing the code directly from the machine readable storage device, by copying the code from the storage device into another storage device such as a hard disk, RAM, etc., or by transmitting the code on a network for remote execution. The method form of the invention may be practiced by combining one or more machine readable storage devices containing the code according to the invention with appropriate standard computer hardware to execute the code contained therein. An apparatus for practicing the invention can be one or more computers in storage systems containing or having network access to computer programming code according to the invention.

With reference to FIG. 1, the controller for the LSA system includes data memory 30 and operational memory 32. The data memory includes a write buffer 34 (consisting of a number of open segments), an LSA directory 36 and cache memory 38. The cache memory has substantially larger storage capacity than the write buffer. The cache memory may contain both "dirty" (updated) logical tracks, which are data midified by the host computer, and "clean" logical tracks, which are unmodified data, the same as the corresponding data on the HDDS.

When data is sent to an LSA controller for storage the data is compressed and stored in the cache memory where the data might remain for some time. The part of the cache that contains dirty data is typically battery protected such that it acts as a nonvolatile store. The controller determines the time for moving data from the cache memory to the write buffer. For example when a portion of cache memory that is occupied by dirty tracks exceeds a predetermined threshold, then a dirty track and all logically adjacent tracks that are in the cache buffer are moved from the cache memory to the write buffer. Often a storage system controller will also include a cache memory directory, which keeps track of most recently used and less recently used logical tracks.

While described with reference to HDDs, the invention is not limited to that type of storage device. A typical HDD 22 is a magnetic hard disk device which has multiple platters where data is recorded in concentric tracks on both surfaces of the platters. Conventionally the tracks are sequentially numbered from platter to platter within a single storage device. The first outer most track on a first platter is track 1.

A segment column is defined as an arbitrary number of contiguous physical tracks numbered sequentially as described above. Typically it is desirable to define a segment column to be the same size as a logical cylinder. The collection of disk recording areas comprising corresponding segment columns from each of the HDDS forms what is called a segment.

LSA segments are categorized as one of the following: FREE, meaning that segment contains no valid data and is ready to be opened; OPEN, meaning the segment is available to hold logical tracks being written to the disks ("destaged") and is in the process of being filled with logical tracks being destaged; CLOSING, meaning no destage data can be further assigned to it and it is in the process of being closed and written to the disks; and CLOSED, meaning all of its data has been written to the disks.

The logical tracks in a logical cylinder may be destaged (written to disk) together to enhance the performance of a sequential access. A logical cylinder is called a "neighborhood." Other groupings of logically sequential data may also be categorized as a neighborhood. A group of logical tracks in a logical cylinder destaged together is called a "neighborhood in destage."

Destaging a neighborhood involves assigning it to an open segment. The open segment remains available to accept other neighborhoods in destage until it is deemed full enough to close. All of the data blocks and parity that constitute a segment are written to a disk before the segment is considered closed. Each logical track in the open segment has an entry in the segment's directory that describes the track's location in the segment. The segment directory is written on the disk as part of the segment at segment closing time. The LSA directory is updated to reflect the new physical storage locations of the updated current (or valid) logical tracks.

Closed LSA segments written to the storage device have "live" tracks and "holes." Live tracks are tracks that have not been updated since being assigned to the segment and contains current, valid data. Holes refer to the space vacated by tracks that were assigned to the segment but subsequently were updated and assigned to a different open segment. Holes also develop if unassigned space remains when the segment is closed.

Garbage collection is the process of reclaiming "holes" in closed segments on the storage devices. Garbage collection is started when the number of free segments falls below a certain threshold. Segments having a relatively low total number of sectors of live tracks are identified for the garbage collection process.

The process of garbage collecting a segment involves reading the segment's directory from disk then scanning each directory entry and comparing the track's address as indicated by the entry with the address as indicated by the main LSA directory entry. If the two entries match, then the track still resides in the segment and is considered live (current and valid). All the live tracks are then read from the disk into the memory buffer and sorted by neighborhood. These neighborhoods in destage proceed to be destaged as if the data had been sent from a cache buffer. The LSA controller having a multi-tasking processor with significant memory can perform garbage collection as a background process. When a segment's occupancy declines to zero, either as a result of garbage collection or as a result of movement of logical tracks from normal destage activity, the segment becomes a "free" or available segment.

The disk array storage space is divided into partitions. The controller creates a map representation of each partition, where each partition comprises a selected number of byte sectors, or tracks of each disk drive in the array. The controller receives a request to allocate a number of storage partitions, which also can be thought of as logical volumes. These requests may originate from the user input device or the host computer application. Each request includes a size and a function mode for each storage partition. Based on the request, the controller operates each storage partition as a logical volume according to the requested function mode. In an illustrative embodiment the function modes may include LSA, home address (HA), non-RAID, and various levels of RAID.

Figure 2:
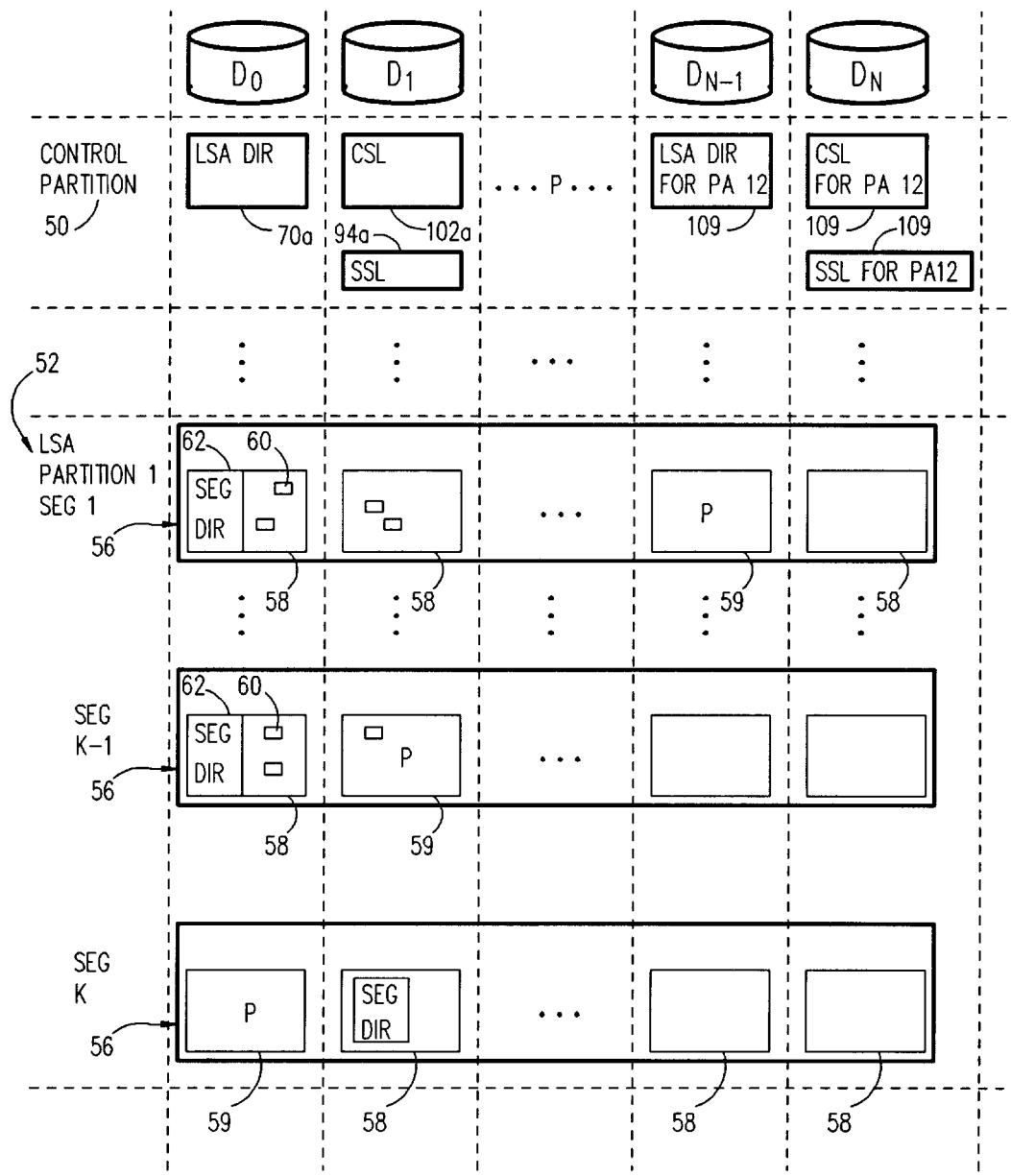
FIG. 2 is a representation of a layout of data blocks in segments on a disk array according to the preferred embodiment of the invention.

Referring to FIG. 2, a layout of the disk system is shown where there are N+1 drives, where N is the number of data drives. The total disk space of N+1 drives is partitioned for example as a control partition 50 and LSA partition 52. In the LSA partition, the storage is arranged as segments 56, where each segment has N data segment columns 58 and one parity segment column 59. The logical tracks 60 are stored within the data segment columns. A segment directory 62 is stored in a small number of sectors out of the a segment's total disk space. As shown in FIG. 2, each segment directory resides in the same data segment column of each segment. Alternatively, the segment directory can be spread among the devices. In a RAID-5 system, parity is distributed among the devices as shown. When an LSA partition is created its corresponding control partition is also created. The control partition is parity protected, but is not log structured; data stored in a control partition is updated in place. The control partition stores the checkpoint values of the main LSA directory and other checkpoint information.

In the preferred embodiment of the invention, a checkpoint of the LSA directory is periodically written to the disks. Also, a list is maintained of the segments that have been written to the disks closed since the last checkpoint of the LSA directory. Following a failure or error affecting the LSA directory in memory, the LSA directory is recovered by applying the changes as recorded by the segment directories of segments on the closed segments list to the most recent checkpoint of the main directory. This invention incorporates unique adjustments into checkpointing methodologies for the log structured implementation of a RAID I/O system.

Figure 3:
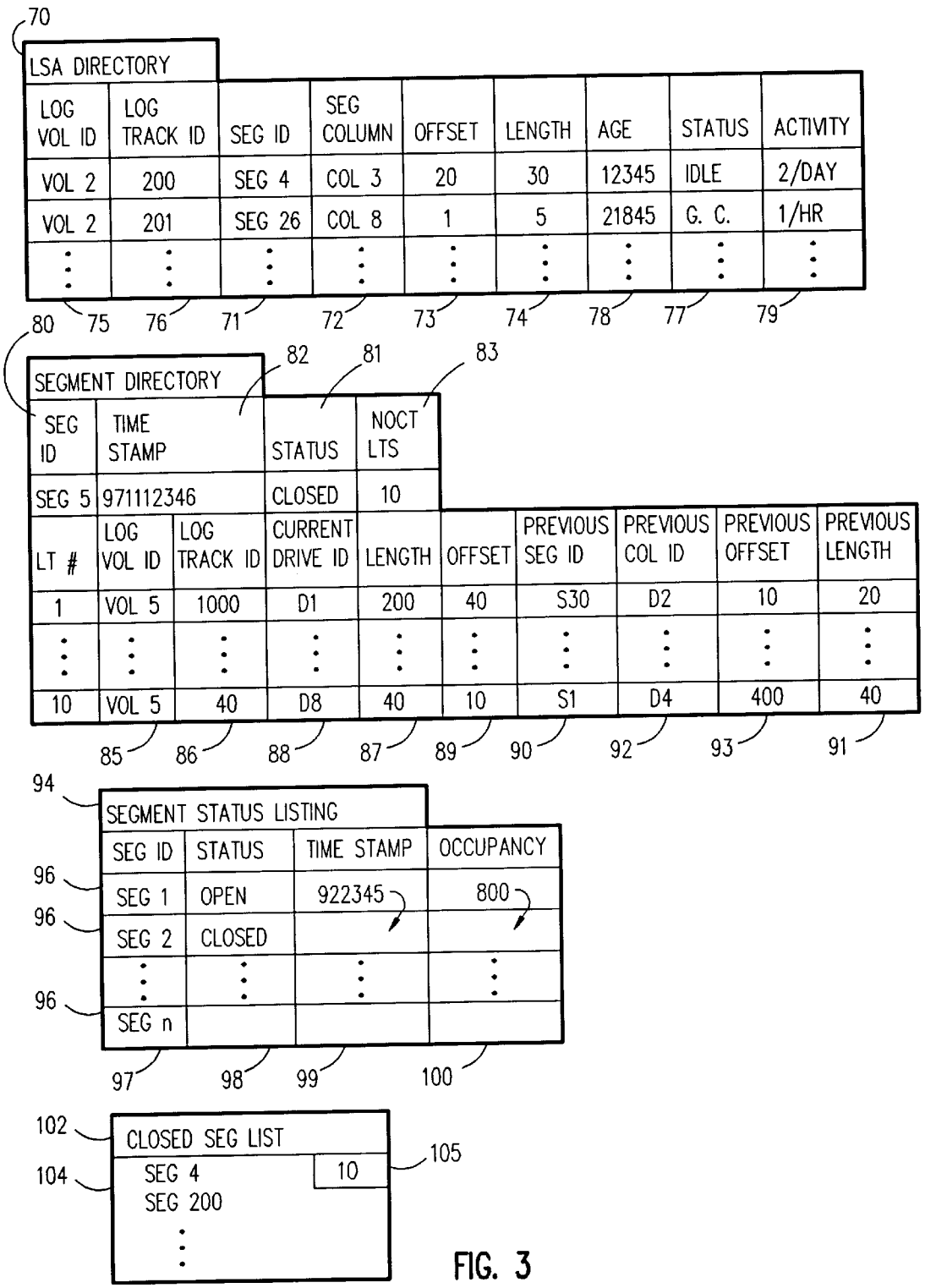
FIG. 3 is a representation of the control structures used in the preferred embodiment of the invention.

FIG. 3 illustrates data structures utilized by the LSA system and particularly the checkpoint and recovery process. The LSA directory 70 has an entry for each logical track providing its physical address in an LSA partition. Each directory entry consists of the segment number 71, the segment column number 72 which is used to determine the drive ID, the offset within the segment column 73 in blocks, and the length of the logical track 74 in blocks. The LSA directory 70 is accessed using the logical volume ID 75 and the logical track ID 76 to provide a mapping to the physical storage location, the drive ID and beginning block address (using the segment column and offset). Information on logical track status 77, on whether it is being staged (read from disk), or destaged (written to disk), or garbage collected, when it was written (the age) 78, and frequency of accesses (activity) of the logical tracks 79 is also stored in the LSA directory.

A second LSA data structure is the segment directory 80, which resides in each of the segments. The segment directory contains a time stamp at segment closing 82, and the number of logical tracks in the segment at segment closing 83. For each of the logical tracks in that segment, the segment directory provides information on the logical volume ID 85, logical track ID 86, current length in blocks 87, current drive ID 88, current offsets from beginning of the segment column 89, previous segment ID 90, previous length in blocks 91, previous drive ID 92, and the previous offset 93 from beginning of the segment column in blocks, where "current" refers to the time frame when the segment was closed (written to disk). The previous location of the logical track is used for recovering the data structure used for garbage collection, the segment status listing.

Another data structure used by the LSA is the segment status listing 94 which consists of elements 96 that describe the segments in a partition. The segment ID 97 is used as an index. Each segment consists of the segment status 98, the time stamp at closing 99, and the occupancy 100, which is the sum of the lengths of the segment's live tracks. The segment status listing is scanned to identify segments with an occupancy below a threshold that are selected for garbage collection.

Another data structure used for this invention is the closed segments list 102 which consists of the current list size 105 and the segment numbers of those segments that have been closed since the previous checkpoint 104. A checkpoint threshold can be used to ensure that a maximum size of the list is not exceeded since the last checkpoint.

The segment status listing and closed segments list are resident in main operational memory 32 as well as stored in the control partition 50 on disk. Because of the large aggregate size of the LSA directory supporting all of the logical volumes assigned to a partition, portions of some LSA directories may not reside in memory. Each directory is divided into pages. An LSA partition is allocated enough memory for N page frames. Accessing a non-memory resident page of a directory requires allocating a free page frame and reading that page from the disk into the page frame.

Referring to FIG. 2, the portion of the disk array called the control partition is reserved for storing a checkpoint of the LSA directory 70a, a checkpoint of the segment status listing 94a and the closed segments list 102a (as well as other control structures not described here).

Figure 4:
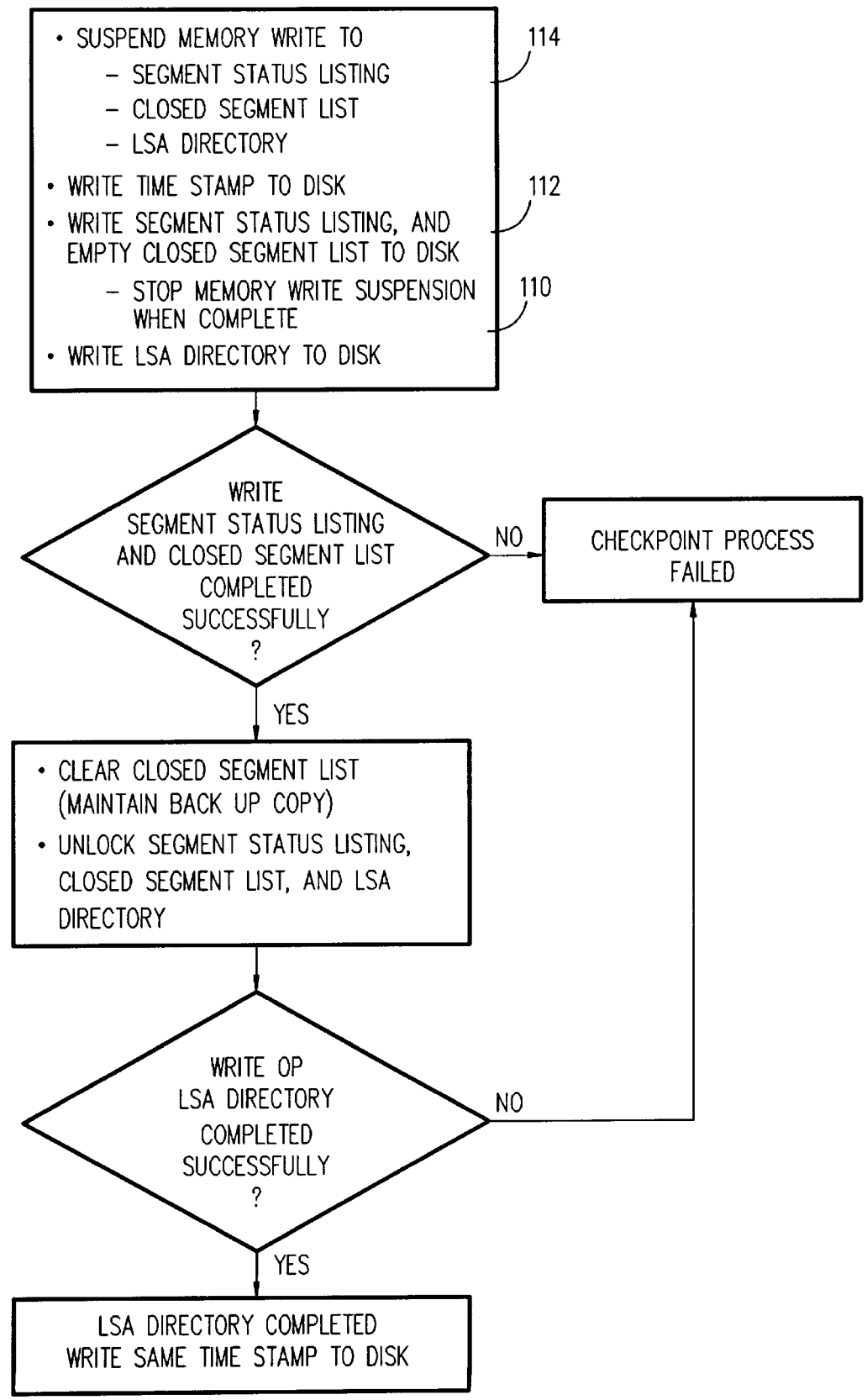
FIG. 4 is a flow diagram of the checkpoint process according to the preferred embodiment of the invention.

The checkpointing process will be described with reference to FIG. 4. At regular intervals measured by the number of segments that are closed, the segment status listing and the modified pages of the LSA directory in a partition are checkpointed to the control partition 110. An empty closed segments list is also written onto the disks 112. The newly written checkpoint now captures a consistent state of the LSA. The empty closed segments list indicates that no updates to the LSA have occurred since the checkpoint was taken.

When an open segment is closed, its segment number is appended to the closed segments list. The list and its corresponding parity are then written to the control partition on the disk. If the list cannot be written to disk ("hardened") successfully the segment cannot successfully complete its closing process. This means that the destage operation of all logical tracks that have been assigned to the segment are considered to have failed. As part of the segment closing procedure the newly closed segment occupancy and closing time are recorded in the appropriate segment status listing entry. The segment directory which is considered part of the physical space allocated to the segment is also stored on the disk during the closing process.

Conflicting requirements pose some difficulties in implementing the checkpoint process. Checkpointing must occur in the background so as to minimize the impact on normal stage and destage operations. If checkpointing and destaging of logical tracks are allowed to execute concurrently, the copy of the control partition data structures that are written on disk will not reflect a consistent snapshot of the state of the LSA partition at an instant of time. To synchronize checkpointing with normal LSA activities, memory updates to the main LSA directory, the segment status listing, and the closed segments list are suspended while the segment status listing and an empty closed segments list are written to the disk as part of the checkpoint process 114.

The size of the segment status listing (having an entry for each segment) depends on the size of the LSA partition. An LSA partition of two sets of 7 disk drives, where each disk drive can store, for example, eight gigabytes of data, can have 18,244 segments in total, or 9122 segments per parity group, given that a segment depth is 1713 sectors with 512 bytes per sector. In such a system, assuming the size of a segment status listing element is 32 bytes, the segment status listing can be as large as 584 kilobytes. Since the control partition is a RAID-5 partition, if the segment status listing is striped across 14 disks, only 41 kilobytes of data are written on each drive for the entire segment status listing.

During the checkpoint process only updates to the three data structures written to the control partition are blocked. Other activities associated with destage operations such as assigning logical tracks to segments, calculating parity and writing logical tracks to disk can proceed concurrently. Therefore, the impact of the update suspension to the normal destage path is limited.

After the segment status listing and an empty closed segments list are safely stored on disk, updates to the control partition data structures are allowed. The checkpointing of an LSA directory can begin at the same time as that of the segment status listing and the closed segments list. Checkpointing may continue after the memory updates to the control partition data structures are allowed to continue. An instantaneous snapshot of the LSA directory is not necessary for the correct reconstruction of the LSA directory from the checkpoint copy.

Figure 5:
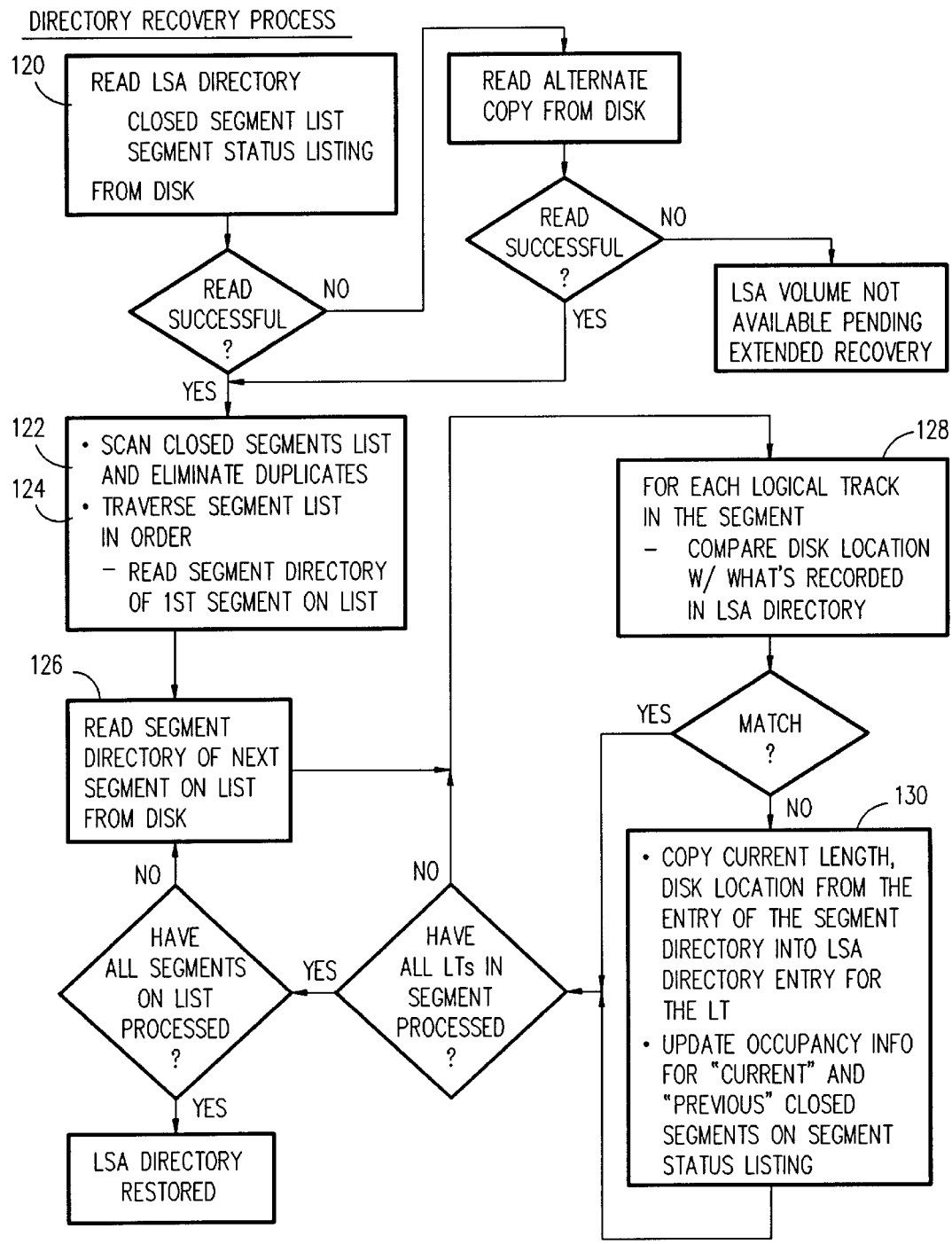
FIG. 5 is a flow diagram of the main LSA directory recovery process according to the preferred embodiment of the invention.
Figure 2:
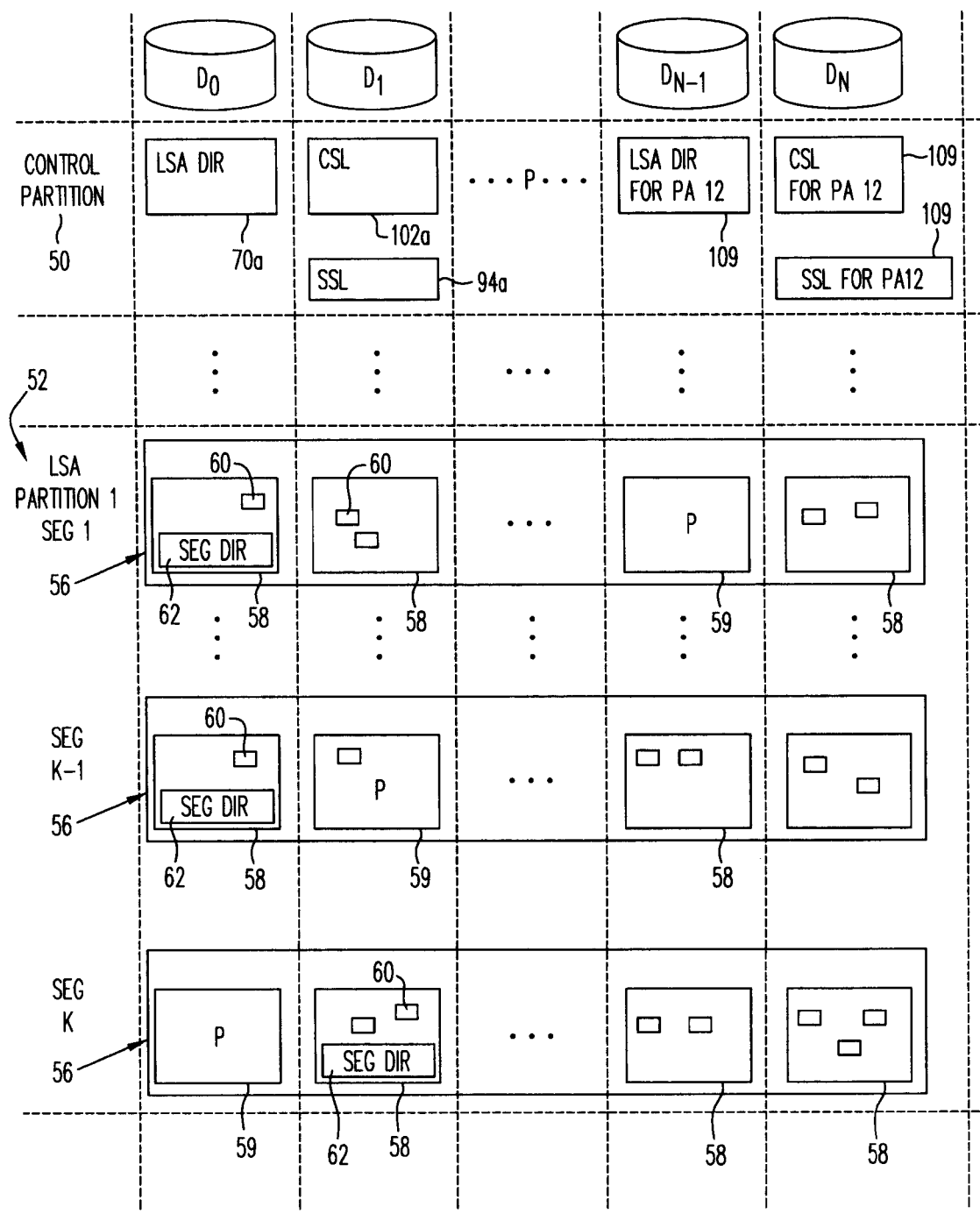
Figure 4:
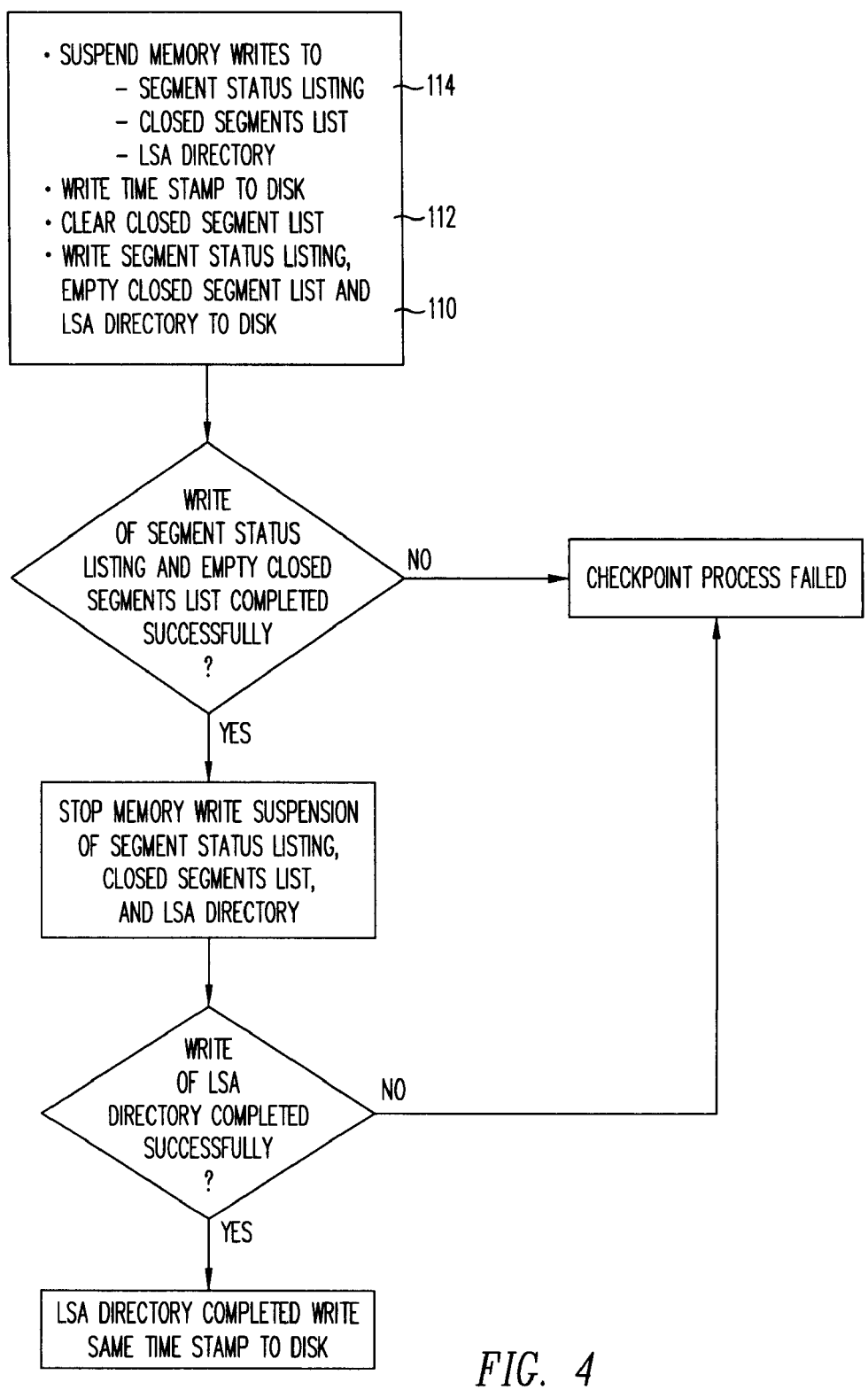
Figure 5:
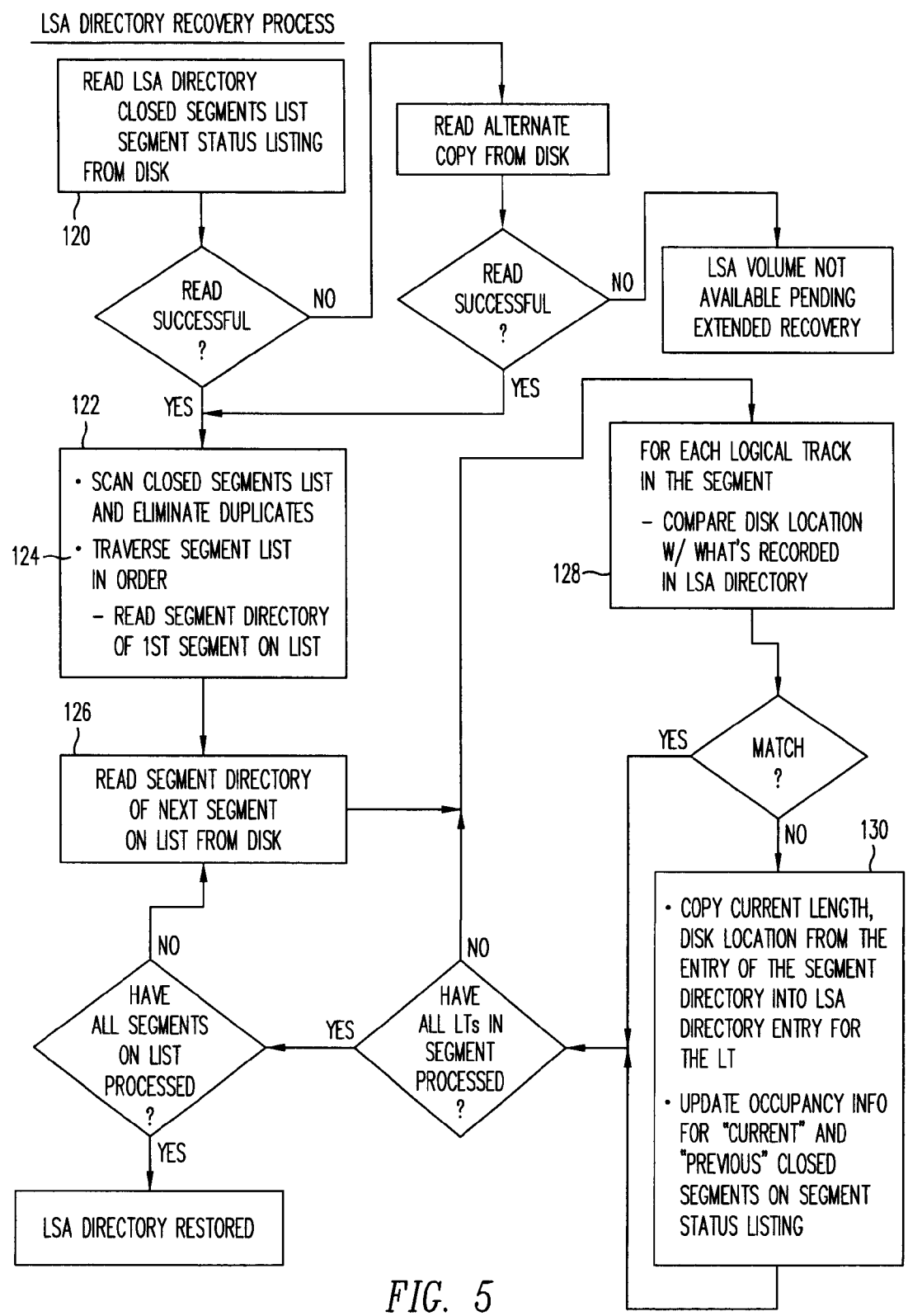

The LSA recovery process is described with reference to FIG. 5. In the event that any part of the LSA directory is corrupted in main memory by a detected MLE or catastrophic failure, the directory may be reconstructed as follows. The most recent and complete checkpoint copy of the LSA directory, closed segments list and segment status listing are read from the disks into main memory 120 where the just read LSA directory is used as the base copy in the main LSA directory recovery. The closed segments list keeps information on the changes after the previous checkpoint and is used to update the base copy of the LSA directory to make it up to date. The segment status listing read from the disks is used to recover the segment occupancy information needed in memory in order for the LSA to be ready to take destage/stage requests again. The current and previous lengths of the logical tracks in the segment directories are used to update the occupancy values in the checkpoint segment status listing.

Since the segment numbers in the closed segments list appear in a chronological order according to a closing time, processing the list in order ensures that the LSA directory will be correctly reconstructed. The closed segments list is first scanned for any duplicate segment numbers 122. If a segment number appears multiple times on the list, only the entry nearest the end of the list is kept. If a segment is placed on the list at times T1 and T2, then all of the tracks assigned to the segment before time T1 have been moved to other segments before time T2. The resulting closed segments list is traversed in order 124. For each segment number listed, the segment directory is read from the device into memory 126. Each segment directory entry describes the location to which a logical track was written when it was assigned to that segment. If the logical track has not been updated since the last checkpointing its disk location as recorded by the LSA directory and segment directory entries are the same. For each segment directory entry the logical track's current address is compared to its address as recorded in the LSA directory entry 128. If the addresses differ, then the logical track's current length and current disk address as described in the segment directory entry are copied into LSA directory entry 130. The logical tracks previous segment number and length also recorded in the segment directory entry are used to readjust the previous segment's occupancy in the segment status listing. If the addresses are the same then no further processing is required for that segment directory entry.

The disk copy of the LSA directory may not reflect the state of the directory at any one instance in time because directory updates can occur as the directory is written to the disk during a checkpoint. For example, where T0 is the time at which the checkpoint commences, all memory updates to the segment status listing are suspended. T1 is the time at which the memory updates are allowed to resume. T2 is the time at which the checkpoint completes. T3 is the time at which the next 15 checkpoint commences. For any logical track that is not updated between T0 and T2 its LSA directory entry on disk reflects its disk location at time T0. For any other logical track, its LSA directory entries on disk may reflect its disk location at any time between T1 and T2. However, those tracks are precisely the tracks assigned to segments that close after time T1. Those segments are identified on the closed segments list and their segment directories will be processed by the recovery procedure should the memory copy of the LSA directory be damaged before time T3. When the recovery process is finished the LSA directory entry for a logical track updated between T0 and T2 matches the segment directory entry in the segment to which it has most recently been assigned. Therefore reconstructing the LSA directories from the segment directories in listed order correctly recreates the control partition data structures.

While the disk copy of the LSA directories need not be a snapshot in order for the recovery procedure to work correctly, this condition does not apply to the segment status listing. The segment occupancies recorded on disk must reflect those in memory at the time the closed segments list is cleared and written on disk. The occupancy numbers obtained at the completion of the recovery process are based on the checkpointed occupancy numbers, since the recovery only subtracts from the checkpointed occupancy, the total lengths of the logical tracks that have been written between T1 and the time the LSA directory recovery starts. The LSA directory need not be a snapshot because updating an LSA directory entry twice with the same information during directory reconstruction is harmless. However, the segment status listing must be a snapshot because subtracting the same number twice from a checkpointed occupancy yields inaccurate results.

Referring again to FIG. 2, further redundancy is built in for this checkpointing process to protect against more than single disk failures. Two or more simultaneous disk failures in two or more different disk drives of the control partition occurring while writing a checkpoint will leave the control partition in an inconsistent state. Therefore two different disk areas in two different disk arrays (parity groups) are allocated for the checkpoint data structures, with each area holding an independent copy of the data structures. Each area is marked with a time stamp that is written twice, once at the start of the checkpoint process and once at the end of the process. Matching time stamps within an area indicate the checkpoint completed successfully. AS shown in FIG. 2, control structures 109 from an LSA in another parity array are also stored in the control partition of this parity array.

The checkpoint of the LSA directories is written to the disk alternating between the two different locations on the disk arrays. That way, a valid copy of the checkpoint is always maintained if a checkpoint attempt failed to one of the areas. In the event that a checkpoint failed, the following checkpoint attempt will be directed to the same area, so as to leave the other area intact. Alternating between disk locations for checkpoint write areas resumes after a successful checkpoint is taken. This redundancy allows the control partition data structures to tolerate two or more simultaneous disk failures during the checkpointing process.

At the recovery time, the time stamps are used to determine which checkpoint copy is most recent and complete and therefore, which set of checkpointed closed segments list, segment status listing, and LSA directory to use.

As has been described, the present invention provides an improved system and method for reconstructing a LSA directory in the event that it is damaged. While the invention has been particularly shown and described with reference to a preferred embodiment it will be understood by those skilled in the art that various changes in form and detail may be made therein without departing from the spirit and scope of the invention.

We claim:

1. In a storage system comprising an array of storage devices, including a processor and memory, having a plurality of data blocks organized on the storage devices in segments striped across the storage devices, wherein when a data block in a segment stored on the storage devices in a first location is updated, the updated data block is assigned to a different segment, written to a new storage location, and designated as a current data block, and the data block in the first location is designated an old data block, and having a main directory, stored in memory, containing the locations on the storage devices of the current data blocks, a method for recovering the main directory in the event the directory is damaged, comprising the steps of:

a) storing on the storage devices, for each segment, a segment directory having information on the data blocks in the segment;

b) periodically writing a checkpoint of the main directory to the storage devices;

c) maintaining a list of closed segments written to the storage devices since the checkpoint of the main directory was written to the storage devices; and d) during a main directory recovery procedure performing the steps of:
    i) reading into memory the checkpoint of the main directory; and
    ii) for each segment as indicated by the closed segments list, using the information in the corresponding segment directory to update the checkpoint of the main directory.

2. The method of claim 1 wherein the checkpoint of the main directory is written to the storage device at regular intervals based on the number of segments written to the storage devices.

3. The method of claim 1 further comprising the steps of:
  periodically recycling segments having a relatively low occupancy value such that the current data blocks are rewritten to the storage device as part of different segments;
  maintaining a status listing for each segment including information on when that segment data was written to the storage devices, segment status, and the occupancy value for that segment;
  writing a checkpoint segment status listing and an empty closed segments list to the storage devices at the same time that the main directory is written to the storage devices; and
  during the main directory recovery procedure, for data blocks that have been updated since the previous checkpoint, using the closed segments list to identify the newly written segments and using the segment directories to identify the previous segments in which the data blocks previously resided; and
  using the current and previous lengths of the data blocks in the segment directories to update the occupancy values in the checkpoint segment status listing.

4. The method of claim 3 further comprising the step of: suspending memory updates to the segment status listing, the closed segments list, and main directory during the writing of the checkpoint segment status listing and the empty closed segments list.

5. The method of claim 4 further comprising the step of:
  at the same time that a closed segment is written to the storage devices, updating the closed segments list, writing the updated closed segments list to the storage devices, and writing the segment directory for that closed segment to the storage devices as part of the segment.

6. The method of claim 5 wherein a portion of the storage devices is partitioned as a control partition and the checkpoint of the main directory, the checkpoint segment status listing and the closed segments list are written to the control partition.

7. The method of claim 1 wherein each segment includes parity information used to reconstruct the data blocks of the segment in the event a storage device is damaged.

8. The method of claim 1 wherein the checkpoint of the main directory is written to two different locations on separate storage arrays, and a timestamp is written at the start and end of each copy.

9. A data storage system for storing electronic data for a data processing system, the data storage system comprising:
  an array of storage devices, including a processor and memory, having a plurality of data blocks organized on the storage devices in segments striped across the storage devices, wherein data blocks are designated as current data blocks and old data blocks;
  a main directory, stored in memory, containing the location on the storage devices of each of the current data blocks;

a plurality of segment directories, each segment directory having information on the data blocks in a given segment;

a checkpoint of the main directory periodically written to the storage devices; and a closed segments list of segments written to the storage devices since the checkpoint of the main directory was written to the storage devices, wherein the main directory is recoverable using the checkpoint directory and the information in the segment directories of the segments listed in the closed segments list.

10. The system of claim 9 wherein the main directory is written to the storage device at regular intervals based on the number of segments written to the storage devices.

11. The system of claim 9 wherein periodically closed segments having a relatively low occupancy value are recycled such that the current data blocks are rewritten to the storage device as a part of a different segment, and the recycled segment is designated a free segment.

12. The system of claim 11 further comprising:

a segment status listing maintained in the memory for each segment including information on when a segment was written to the storage devices, segment status, and the occupancy value of the segment; and a checkpoint segment status listing stored on the storage devices, the checkpoint segment status listing and an empty closed segments list being written to the storage devices at the same time that the checkpoint of the main directory is written to the storage devices, wherein the checkpoint directory, the closed segments list, the segment directories of the segments on the closed segments list and the checkpoint segment status listing are used to recover a damaged main directory and update the segment status listing stored in memory.

13. The system of claim 12 wherein a portion of the storage devices is partitioned as a control partition and the checkpoint of the main directory, the checkpoint segment status listing and the closed segments list are written to the control partition, and each segment directory is written as part of the segment.

14. In a storage system comprising an array of storage devices, including a processor and memory, having a plurality of data blocks organized on the storage devices in segments striped An across the storage devices, and each segment includes parity information used to reconstruct the data blocks of the segment in the event a storage device is damaged, wherein when a data block in a segment stored on the storage devices in a first location is updated, the updated data block is designated a current data in block and written to a new storage location as part of a different segment, and the data block in the first location is designated an old data block, and having a main directory, stored in memory, containing the location on the storage devices of each of the current data blocks, a system for recovering the main directory in the event the main directory is damaged, comprising:

means for storing on the storage devices, for each segment, and as part of the segment, a segment directory having information on the data blocks in the segment;

means for periodically writing a checkpoint of the main directory to the storage devices;

means for maintaining a list of closed segments written to the storage devices since the checkpoint directory was written to the storage devices wherein the closed segments list is updated on the storage devices each time a segment is closed;

means for reading into memory the checkpoint of the main directory;

means for reading into memory the checkpoint closed segments list; and means for using the information in the segment directories of the segments identified in the closed segments list to update the checkpoint directory.

15. An article of manufacture for use in storing and managing a plurality of sets of data blocks in a computer system having memory and a group of storage devices, wherein each set of data blocks is stored in a segment striped across the group of storage devices, the article of manufacture having a computer program code embodied in said medium which causes the computer system to:

update a data block in a segment stored on the storage devices in a first location by writing the updated data block to a new storage location, wherein the updated data block is designated a current data block and the data block in the first location is designated an old data block;

maintain a main directory, stored in memory, containing the location on the storage devices of each of the current data blocks;

store on the storage devices, for each segment, a segment directory having information on the data blocks in the segment;

write a checkpoint of the main directory to the storage devices at periodic intervals;

maintain a list of closed segments written to the storage devices since the checkpoint of the main directory was written to the storage devices; and recover a damaged main directory using the checkpoint directory and the information in the corresponding segment directory for each segment on the closed segments list.

16. The article of manufacture as claimed in claim 15 wherein the program code further causes the computer to:

recycle identified segments having a relatively low occupancy value by writing the current data blocks in the identified segment to the storage devices as part of different segments;

maintain a segment status listing for each segment including information on when that segment was written to the storage devices, segment status, and the occupancy value of that segment;

write a checkpoint segment status listing to the storage devices at the same time that the checkpoint directory is written to the storage devices; and recover a damaged segment status listing using the checkpoint segment status listing and updating the occupancy value in the checkpoint segment status listing for each of the segments affected by the segments on the closed segments list.

17. The article of manufacture as claimed in claim 15 wherein the program code further causes the computer to:

suspend memory updates to the main LSA directory, the segment status listing and the closed segments list during the writing of the checkpoint segment status listing and the empty closed segments list;

at the same time that a segment is written to the storage devices, update the closed segments list, write the updated closed segments list to the storage devices, and write the segment directory for that closed segment to the storage devices; and at the same time that the checkpoint of the main directory is written to the storage devices, write an empty closed segments list to the storage devices.

18. The article of manufacture as claimed in claim 17 wherein the program code further causes the computer to:

partition a portion of the storage devices as a control partition wherein the checkpoint of the main directory, the checkpoint segment status listing and the closed segments list are written to the control partition; and write each segment directory as part of the corresponding segment.

19. The article of manufacture as claimed in claim 15 wherein each segment includes parity information used to reconstruct the current data blocks of the segment in the event a storage device is damaged.

* * * * *

UNITED STATES PATENT AND TRADEMARK OFFICE
CERTIFICATE OF CORRECTION

PATENT NO.   : 6,052,799
DATED        : April 18, 2000
INVENTOR(S)  : Li et al.

It is certified that error appears in the above-indentified patent and that said Letters Patent is hereby corrected as shown below:

Column 2, line 41, "HDDS" should be --HDDs--.
Column 3, line 57, "degment" should be --segment--.
Column 5, line 64, "HDDS" should be --HDDs--.
Column 6, line 23, "HDDS" should be --HDDs--.
Column 11, line 19, "AS" should be --As--.

Column 13, line 43, "striped An across" should be --striped across--.
Column 13, line 48, "data in block" should be --data block--.

Signed and Sealed this

Twentieth Day of March, 2001

Attest:

NICHOLAS P. GODICI

Attesting Officer        Acting Director of the United States Patent and Trademark Office

UNITED STATES PATENT AND TRADEMARK OFFICE
CERTIFICATE OF CORRECTION

PATENT NO. : 6,052,799
DATED : April 18, 2000
INVENTOR(S) : Juan Li et al.

It is certified that error appears in the above-identified patent and that said Letters Patent is hereby corrected as shown below:

Substitute title page with the attached title page.

Delete the drawings and substitute the attached 4 sheets of drawings.

Signed and Sealed this

Fourth Day of April, 2006

JON W. DUDAS
*Director of the United States Patent and Trademark Office*

United States Patent [19]
Li et al.

[11] Patent Number: 6,052,799
[45] Date of Patent: Apr. 18, 2000

[54] SYSTEM AND METHOD FOR RECOVERING A DIRECTORY FOR A LOG STRUCTURED ARRAY

[75] Inventors: Juan Li; Dung K. Nguyen, both of San Jose; Mien Shih, Saratoga; Hai-Fang yun, San Jose, all of Calif.

[73] Assignee: International Business Machines Corporation, Armonk, N.Y.

[21] Appl. No.: 09/079,913

[22] Filed: May 15, 1998

[51] Int. Cl.$^7$ .................... G06F 11/00; G06F 12/00
[52] U.S. Cl. .................. 714/13; 714/20; 711/114; 711/136
[58] Field of Search .................. 714/1, 6, 7, 10, 714/13, 15, 16, 20, 710, 764, 769, 770, 799; 711/111–114, 136, 211

[56] References Cited

U.S. PATENT DOCUMENTS

| | | | |
|---|---|---|---|
| 4,914,656 | 4/1990 | Dumphy, Jr. et al. | 714/710 |
| 5,247,647 | 9/1993 | Brown et al. | 714/1 |
| 5,263,145 | 11/1993 | Brady et al. | 711/114 |
| 5,301,297 | 4/1994 | Menon et al. | 711/114 |
| 5,379,385 | 1/1995 | Shomler | 711/211 |
| 5,394,532 | 2/1995 | Belsan | 711/114 |
| 5,488,701 | 1/1996 | Brady et al. | 714/6 |
| 5,551,003 | 8/1996 | Mattson et al. | 711/136 |
| 5,555,371 | 9/1996 | Duyanovich et al. | 714/13 |

OTHER PUBLICATIONS

Patterson et al., A Case for Redundant Arrays of Inexpensive Disks (RAID), ACM SIGMOD 88, Jun. 1988, pp. 109–116.

Rosenblum et al., "The Design and Implementation of a Log Structured File System", Proceedings of the Thirteenth ACM Symposium on Operating Systems Principles, Oct. 13–16, 1991 Asilomar Conference Center.

Douglis et al., "Log–Structured File Systems", IEEE, Feb. 27–Mar. 3, 1989 Spring CompCon 89, 34th IEE Computer Conference.

*Primary Examiner*—Emmanuel L. Moise
*Attorney, Agent, or Firm*—Esther E. Klein

[57] ABSTRACT

In a storage system comprising an array of storage devices including a processor and memory, a plurality of data blocks are organized on the storage devices in segments striped across the storage devices. A main directory stored in memory contains the location on the storage device of each of the current data blocks. A method is provided for recovering a main directory in the event that the main directory becomes damaged. A segment directory having information on the data blocks in the segment is stored as part of the segment on the storage devices. Periodically a checkpoint of the main directory is written to the storage devices. A list is maintained of closed segments written to the storage devices since the checkpoint directory was written to the storage devices. During a main directory recovery procedure, the checkpoint of the main directory is read into memory, and for each segment that is indicated by the closed segments list as having been closed since the checkpoint of the main directory was written to the disk, the information in the corresponding segment directory is used to update the checkpoint directory.

19 Claims, 5 Drawing Sheets

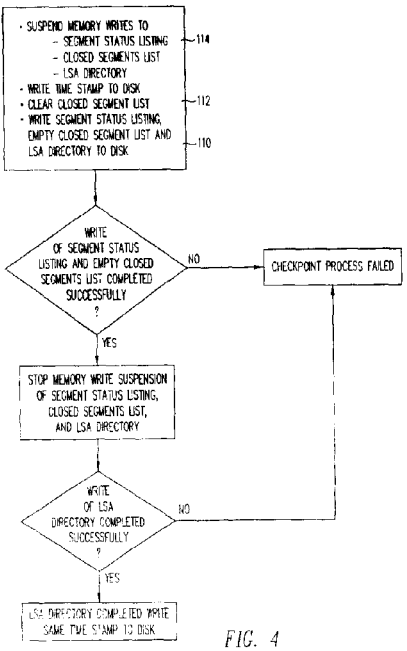

FIG. 4

LSA DIRECTORY (70)

| LOG VOL ID (75) | LOG TRACK ID (76) | SEG ID (71) | SEG COLUMN (72) | OFFSET (73) | LENGTH (74) | AGE (78) | STATUS (77) | ACTIVITY (79) |
|---|---|---|---|---|---|---|---|---|
| VOL 2 | 200 | SEG 4 | COL 3 | 20 | 30 | 12345 | IDLE | 2/DAY |
| VOL 2 | 201 | SEG 26 | COL 8 | 1 | 5 | 21845 | G. C. | 1/HR |
| ⋮ | ⋮ | ⋮ | ⋮ | ⋮ | ⋮ | ⋮ | ⋮ | ⋮ |

SEGMENT DIRECTORY (80)

| SEG ID | TIME STAMP (82) | # OF LTs (83) |
|---|---|---|
| SEG 5 | 971112346 | 10 |

| LT # | LOG VOL ID (85) | LOG TRACK ID (86) | CURRENT DRIVE ID (88) | LENGTH (87) | OFFSET (89) | PREVIOUS SEG ID (90) | PREVIOUS COL ID (92) | PREVIOUS OFFSET (93) | PREVIOUS LENGTH (91) |
|---|---|---|---|---|---|---|---|---|---|
| 1 | VOL 5 | 1000 | D1 | 200 | 40 | S30 | D2 | 10 | 20 |
| ⋮ | ⋮ | ⋮ | ⋮ | ⋮ | ⋮ | ⋮ | ⋮ | ⋮ | ⋮ |
| 10 | VOL 5 | 40 | D8 | 40 | 10 | S1 | D4 | 400 | 40 |

SEGMENT STATUS LISTING (94)

| SEG ID (97) | STATUS (98) | TIME STAMP (99) | OCCUPANCY (100) |
|---|---|---|---|
| SEG 1 | OPEN | | |
| SEG 2 | CLOSED | 922385 | 900 |
| ⋮ | ⋮ | ⋮ | ⋮ |
| SEG n | | | |

CLOSED SEG LIST (102)

| (104) | (105) |
|---|---|
| SEG 4 | 10 |
| SEG 200 | |
| ⋮ | |

*FIG. 3*